Figure 1:
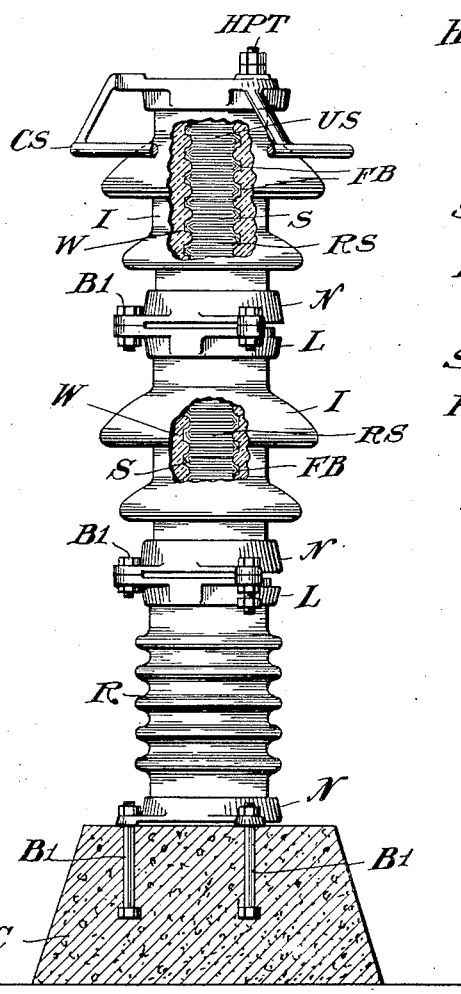

July 26, 1932.  J. A. PROCTOR  1,869,169
ELECTRICAL CONDENSER
Filed Dec. 21, 1927

Inventor:
John A. Proctor
By his Attorney
Philip Farnsworth

Patented July 26, 1932

1,869,169

UNITED STATES PATENT OFFICE

JOHN ALBERT PROCTOR, OF LEXINGTON, MASSACHUSETTS, ASSIGNOR, BY MESNE ASSIGNMENTS, TO GENERAL ELECTRIC COMPANY, A CORPORATION OF NEW YORK

ELECTRICAL CONDENSER

Application filed December 21, 1927. Serial No. 241,473.

This invention relates to electrical condensers, and more particularly to condensers for use with high power transmission lines for insulating said lines from the ground and for applying high frequency signalling currents thereto.

It is frequently desirable to utilize transmission lines for signalling as well as for the transmission of power, thereby eliminating the necessity for separate communication lines. This may be accomplished by impressing upon the low frequency power lines a high frequency current, commonly called a carrier current, which is modulated in accordance with signals. The carrier current may be impressed upon the lines through a condenser which is capable of passing a high frequency current while preventing passage of low frequency power currents. The condenser furthermore must be capable of insulating both the high frequency currents and the high voltage power currents from the ground and positively preventing the high voltage current from being impressed on the carrier signalling apparatus.

This invention provides a series condenser enclosed in an insulating structure and suitably insulated to avoid breakdown due to the impressed high tension currents, and of a capacity adapted to pass the high frequency signalling currents. The condenser furthermore is designed to withstand other voltages, such as those produced by current surges in the line, and particularly due to sudden lightning discharges.

It is well known that the field produced by a high tension current will be distributed unequally along an insulator which supports the transmission line. Breakdown is most likely to occur at the high tension end of the insulator. This has been attributed to various factors, as for example, the leakage over the surface of the insulator whereby the charge may partially leak off before the low tension end is reached. At any rate, the portion closest the high tension line is subjected to the greatest potential strain and must be protected from breakdown.

In accordance wih the present invention, this is accomplished by increasing the thickness of the dielectric in the unit or units adjacent the high tension line. In a condenser formed of a plurality of sections of substantially equal capacity, the danger of breakdown may be considerably reduced by this expedient since the sections subjected to the greatest strain will be formed with thicker dielectric and stronger insulation.

The invention further provides an improved means for mounting such condensers, and for protecting the same from damage due to mechanical forces and atmospheric conditions. The condensers are entirely enclosed in an insulating casing preferably formed with an irregular surface for the purpose of increasing the surface length and for protecting portions thereof from moisture.

The invention also consists in certain new and original features of construction and combinations of parts hereinafter set forth and claimed.

Figure 2:
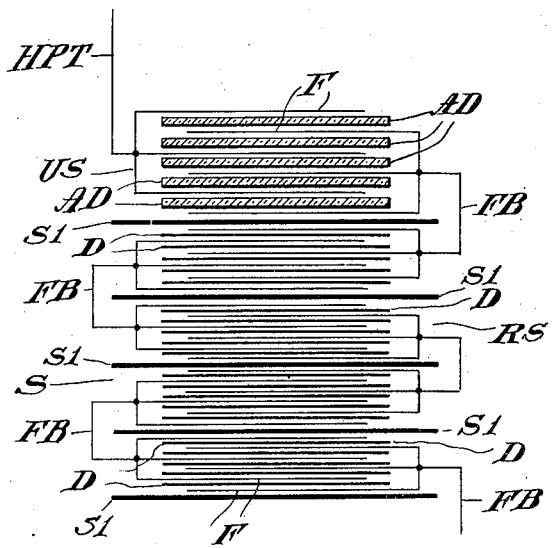

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which Fig. 1 is an elevation with parts broken away showing the condenser assembly constructed in accordance with this invention; and Fig. 2 is a diagrammatic illustration of the condenser sections showing the increased dielectric thickness of certain portions.

Like reference characters denote like parts in the several figures of the drawing.

In the following description and in the claims parts will be identified by specific names for convenience, but they are intended to be as generic in their application to similar parts as the art will permit.

Referring to the drawing more in detail, a condenser is shown as formed from a plurality of sections S which are enclosed in an insulating casing I having the external appearance of a high tension insulator. The surface of the casing may be corrugated or roughened both for the purpose of increasing the surface distance between terminals and for shielding certain portions from moisture. Upper and lower collars L and N respectively are secured to insulator I and serve as terminals for the condenser and supporting means for the assembly. Said sections may be provided with suitable feet which may be secured to the adjacent sections as by bolts B1.

A condenser stack S may be formed of a plurality of sections RS of the usual construction having interleaved dielectric sections D and conducting foils F which may be arranged in groups FB, separated by suitable insulating separators S1, and connected in series parallel relationship. The particular formation of these sections, however, forms no part of this invention and is well known in the art.

The upper section US, which is adapted to be located adjacent the high potential terminal, is formed with dielectric sections AD of increased thickness between which the conducting foils F are interleaved. The specific amount by which the dielectric elements AD are thicker than the remaining dielectric elements D and also the number of sections which are provided with this increased insulation will depend upon the voltage with which the condenser is to be used and the capacity required for impressing the carrier current thereon. The relation should therefore be such that each of the sections are substantially equally liable to breakdown when an excessively high potential is applied such as that incident to line surges or direct lightning stroke.

The space between the condenser stack S and insulating casing I may be filled with suitable insulating material W such as wax, and the terminals of the condenser connected to the upper and lower collars L and N. Corona shield CS in the form of a metallic ring or any other well known form may be secured to the upper collar of the insulator I located adjacent the high tension line. High potential terminal HPT may be secured to the corona shield and form a means for connecting and supporting the line thereon. The action of the corona shield in equalizing the distribution of the electrostatic forces and in preventing breakdown of the insulator structure is well known in the art and will not be described in detail.

The lower condenser section may be secured to an insulator R as by means of bolts B1 passing through aligned openings in collars L and N respectively secured to said elements whereby both the carrier current and the high tension line are insulated from a grounded base or concrete supporting means C. Lower collar N of insulator R may be secured to said base as by bolts B1.

Lower collar N of the lowermost condenser section may be provided with a low potential terminal to which the carrier current line may be secured. Insulator section R will only be required to directly withstand the potential of the carrier current, whereas the complete section comprising insulator R and insulators I must withstand the entire line potential.

Condenser stack S enclosed in insulators I is capable of passing the high frequency carrier current applied from the signalling apparatus and impressing this current down the power line. The low frequency power currents will, however, be incapable of passing such condenser sections and effectively insulated thereby from the carrier current apparatus.

The liability of the condensers to breakdown is decreased by reason of the increased thickness of the dielectric material forming the upper sections thereof, which sections as above pointed out are required to withstand excess voltages during the operation of the power line. Furthermore, the structure is compact and readily assembled, and is designed so that danger of mechanical injury to the parts is practically eliminated. Although two sections have been shown as connected in series and insulated from the ground by insulator R, it is obvious that any desired number may be employed depending upon the voltages they will be required to withstand.

This invention provides a cheap and simple means for connecting a carrier signal apparatus to a high potential power line, while at the same time preventing the power currents from being impressed upon the carrier signalling apparatus and injuring said apparatus or the operators.

In the drawing accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

What is claimed is:

1. A high potential condenser comprising a stack of conducting and insulating elements, an insulating casing therefor having an irregular surface, collars secured to the ends thereof and forming terminals for said condenser, said collars being adapted to form supporting means for said casing, the dielectric elements of the condenser section connected to one of said collars being of increased thickness.

2. A condenser adapted to apply carrier current to a high tension line while preventing passage of the high tension current therethrough, comprising a plurality of sections connected in series relationship, an insulating casing therefor, means for supporting said casing and insulating the same from the ground, the condenser section adjacent the high potential line having increased dielectric strength.

3. A power line carrier current condenser comprising a plurality of sections connected in series, an insulating casing therefor, collars on said casing forming supports and terminals, means for securing the high potential line to one of said collars, means for securing the carrier current line to another of said collars and means for insulating said last mentioned collar from ground, the condenser section adjacent said high potential line having increased dielectric strength.

4. In an apparatus of the character described, a plurality of insulator sections mechanically mounted in series, condensers enclosed in certain of said sections, and means for preventing excess voltages from causing breakdown of the end condenser sections comprising dielectric elements of increasing thickness included in said sections.

5. In combination with a series of insulators adapted to insulate a high tension line, condenser sections enclosed within certain of said insulators and adapted to pass a carrier current while preventing the passage of a high tension current, the condenser sections adjacent the high tension line having dielectric elements of increased thickness to withstand the excessive electrostatic force.

In testimony whereof I hereunto affix my signature.

JOHN ALBERT PROCTOR.